(12) United States Patent
Nagasaka et al.

(10) Patent No.: US 6,313,906 B1
(45) Date of Patent: *Nov. 6, 2001

(54) MULTIBEAM SCANNING DEVICE

(75) Inventors: Yasushi Nagasaka, Okazaki; Jun Kohsaka; Kenji Takeshita, both of Toyokawa, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,543

(22) Filed: Oct. 20, 1998

(30) Foreign Application Priority Data

Oct. 20, 1997 (JP) .................................................. 9-286575

(51) Int. Cl.[7] .......................... G03B 27/54; G01D 15/14; B41J 27/00; G02B 26/08
(52) U.S. Cl. ............................ 355/67; 347/224; 347/261; 359/216
(58) Field of Search ................................. 355/46, 67, 70, 355/77, 85, 88, 89, 133; 399/40, 177, 220, 221; 347/117, 118, 129, 132, 134, 259, 232, 233; 359/196, 204, 212, 216, 217, 223, 224, 226, 261

(56) References Cited

U.S. PATENT DOCUMENTS

| | | | |
|---|---|---|---|
| 5,170,181 | * 12/1992 | Tamada | 346/108 |
| 5,251,055 | * 10/1993 | Koide | 359/216 |
| 5,450,119 | * 9/1995 | Hinton et al. | 347/242 |
| 5,463,418 | * 10/1995 | Tateoka | 347/244 |
| 5,485,194 | * 1/1996 | Tateoka | 347/232 |
| 5,691,761 | * 11/1997 | Fisli | 347/241 |
| 5,818,506 | * 10/1998 | Yamaguchi et al. | 347/259 |
| 5,850,306 | * 12/1998 | Fukutome et al. | 359/204 |
| 5,870,132 | * 2/1999 | Inoue et al. | 347/243 |

FOREIGN PATENT DOCUMENTS 8-271817  10/1996 (JP) .

OTHER PUBLICATIONS

Merriam–Webster Online Dictionary, Definition of "intersect," Encyclopedia Britannica, Inc. and Merriam–Webster, Inc., copyright 1999.*

* cited by examiner

Primary Examiner—Russell Adams
Assistant Examiner—Rodney Fuller
(74) Attorney, Agent, or Firm—Burns, Doane, Swecker & Mathis, LLP

(57) ABSTRACT

Laser beams LK and LY are respectively emitted from laser diodes 51K and 51Y and incident on a mirror face of a polygon mirror 55 via collimator lenses 52K, 52Y and first cylindrical lenses 53K, 53Y. The laser beams LK and LY are reflected off the polygon mirror 55 and deflected. Incidence angles of the laser beams LK and LY are set so that the laser beams LK and LY intersect with each other at a position P which is located before the polygon mirror 55.

39 Claims, 5 Drawing Sheets

MULTIBEAM SCANNING DEVICE

This application is based on an application No. 9-286575 filed in Japan, the content of which is hereby incorporated by reference.

BACKGROUND OF THE INVENTION (1) Field of the Invention

The present invention relates to a multibeam scanning device which is used in a multicolor image forming apparatus, such as a color copying machine and a laser printer.

(2) Related Art

A tandem-type color copying machine, as one example of a conventional multicolor image forming apparatus, has photosensitive drums corresponding to reproduction colors set along a transporting surface of a transport belt. The reproduction colors are cyan, magenta, yellow, and black, which are respectively referred to as C, M, Y, and K hereinafter, and components related to these colors are assigned numerals with a corresponding C, M, Y, or K. A multibeam scanning device has four laser beams emitted, with each laser beam scanning the surface of the corresponding photosensitive drum. As a result, electrostatic latent images corresponding to reproduction colors are respectively formed on the photosensitive drums. The electrostatic latent images are respectively developed into visible toner images using the reproduction color toner. Then, the toner images are sequentially transferred onto a recording sheet to form a color image, with the recording sheet being transported on the transport belt.

A beam scanning device used in such a color copying machine is composed of four laser diodes corresponding to four reproduction colors and an optical system which deflects laser beams emitted from the laser diodes to expose the corresponding photosensitive drums. The optical system includes optical elements, such as a polygon mirror, a scanning lens, and redirecting mirrors.

Each laser diode is driven in accordance with inputted image data and emits a laser beam. The laser beam is reflected off the surface of the polygon mirror which is rotating and deflects the laser beam. Then, the laser beam exposes the corresponding photosensitive drum via lenses, such as the scanning lens.

Here, if a polygon mirror or a scanning lens are provided for each laser beam, cost increases and the construction of the beam scanning device is increased in size.

A multibeam scanning device using one polygon mirror has been suggested. Japanese Laid-Open Patent Application No. 8-271817 teaches an example of such a multibeam scanning device.

FIG. 1 shows a front view of the schematic construction of the multibeam scanning device disclosed in the cited Japanese application.

A multibeam scanning device 100 shown in FIG. 1 has a polygon mirror 101. Four laser beams LK to LC are respectively emitted from four laser diodes (not shown) to one mirror face of the polygon mirror 101 as shown in FIG. 1. The laser beams LK to LC are linearly aligned in a direction parallel to a rotational axis O of the polygon mirror 101, that is, the laser beams LK to LC are aligned in the sub-scanning direction. The deflected laser beams LK to LC intersect with one another at a position P between a toroidal lens 102 and an fθ lens 103, with the position P being located on a plane Q which is perpendicular to the rotational axis O.

The laser beams LK to LC deflected on the mirror face of the polygon mirror 101 get closer to the plane Q as they approach the position P, and intersect with one another at the position P after passing through the toroidal lens 102. The laser beams LK to LC separate from one another with distance from the position P and pass through the fθ lens 103. By means of redirecting mirrors 104aK to 104cK, 104aY to 104cY, 104aM to 104cM, and 104C, light paths of the laser beams LK to LC are redirected so that light path lengths are made equal. Then, the laser beams LK to LC respectively exposes surfaces of photosensitive drums 201K to 201C to form electrostatic latent images, through dust-proof glasses 105K to 105C.

Accordingly, the polygon mirror 101 and the scanning lens including the toroidal lens 102 and the fθ lens 103 are shared by all laser beams. This contributes to cost reduction and to the simplification of the apparatus.

Using this conventional multibeam scanning device, however, the laser beams LK to LC intersect with one another at the position P located immediately before the fθ lens 103. As a result, the laser beams LK to LC separate from one another after passing through the fθ lens 103 in the sub-scanning direction, with only a short distance in between, thereby causing a difficulty to discriminate the laser beams LK to LC.

The laser beams LK to LC should be reliably separated from one another before reaching the photosensitive drums 201K to 201C. Otherwise, insufficient exposure may occur to at least one of the photosensitive drums 201K to 201C, or noises may be caused on a reproduced image. For efficient operation, the separation of the laser beams should be performed using the redirecting mirrors 104aK, 104aY, 104aM, and 104C. However, the laser beams are separated from one another, with a short distance in between as described above, so that there would be a problem if these mirrors are set near the position P.

To address this problem, the redirecting mirrors 104aK, 104aY, 104aM, and 104C can be set away from the position P. Yet, if doing so, a distance between the position P and these mirrors increases, making the whole distance between the mirrors and the polygon mirror 101 longer. In spite of the reduced number of the polygon mirror and the scanning lens, the apparatus is consequently increased is size.

Alternatively, a special lens, such as a toric lens, can be set at the position P for separating the laser beams LK to LC in the sub-scanning direction, so that each distance between the neighboring laser beams increases and the laser beams LK to LC are separated near the position P. In this case, although the distance between the position P and the redirecting mirrors can be shortened, the distance between the position P and the polygon mirror cannot be shortened. In addition, a price of the apparatus may be high.

This problem occurs not only to a multibeam scanning device provided in a tandem-type color copying machine having photosensitive drums, but also to that provided in an image forming apparatus having a construction for forming multicolor images using laser beams.

SUMMARY OF THE INVENTION

The object of the present invention is to provide a multibeam scanning device that easily separates deflected laser beams within a short distance, without making the light path lengths longer or using a special lens.

The object of the present invention is achieved by A multibeam scanning device made up of: a plurality of light sources, each emitting a light beam; and a deflecting unit, provided ahead in a light beam emitting direction of each of the plurality of light sources, for deflecting all light beams respectively emitted from the plurality of light sources, wherein at least two of the plurality of light sources are arranged so that the light beams emitted from the at least two light sources intersect before reaching the deflecting unit.

With this construction, the deflected laser beams are separated from one another in the direction of the rotational axis O with distance from the mirror face. Therefore, if the redirecting mirrors are set nearer to the polygon mirror than usual, the laser beams can be reliably separated from one another.

It should be noted here that "intersect" referred to in the present specification indicates that the laser beams arm intersect with each other on a plane, and also indicates that the laser beams three-dimensionally intersect with each other.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENTS

The following is a description of an embodiment of the multibeam scanning device of the present invention provided in an image forming apparatus. In the embodiment, a tandem-type color digital copying machine (referred to as the "copier" hereinafter) is used as an example of such image forming hit apparatus.

Figure 1:
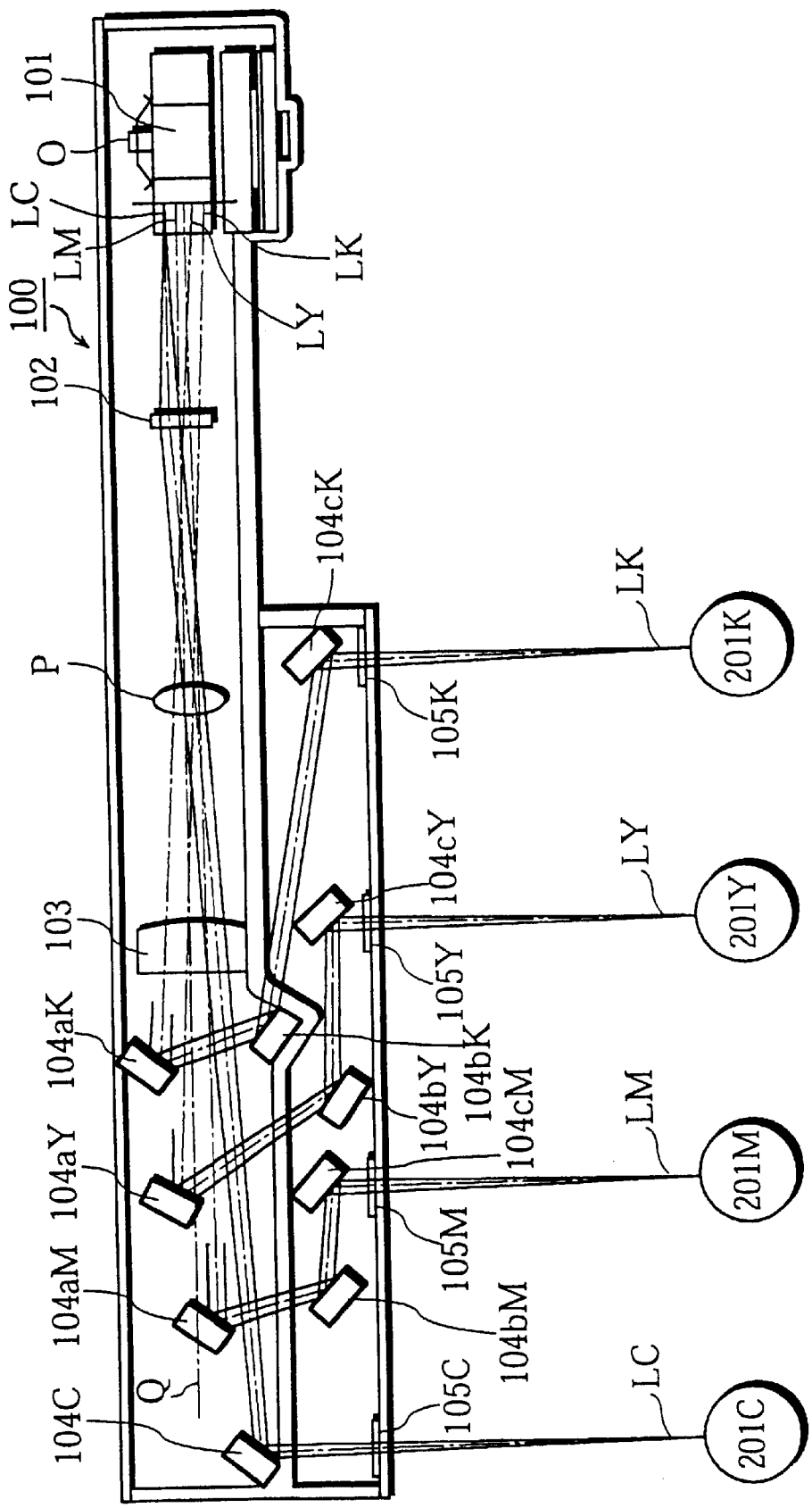
FIG. 1 shows a front view of a schematic construction of a conventional multibeam scanning device.
Figure 2:
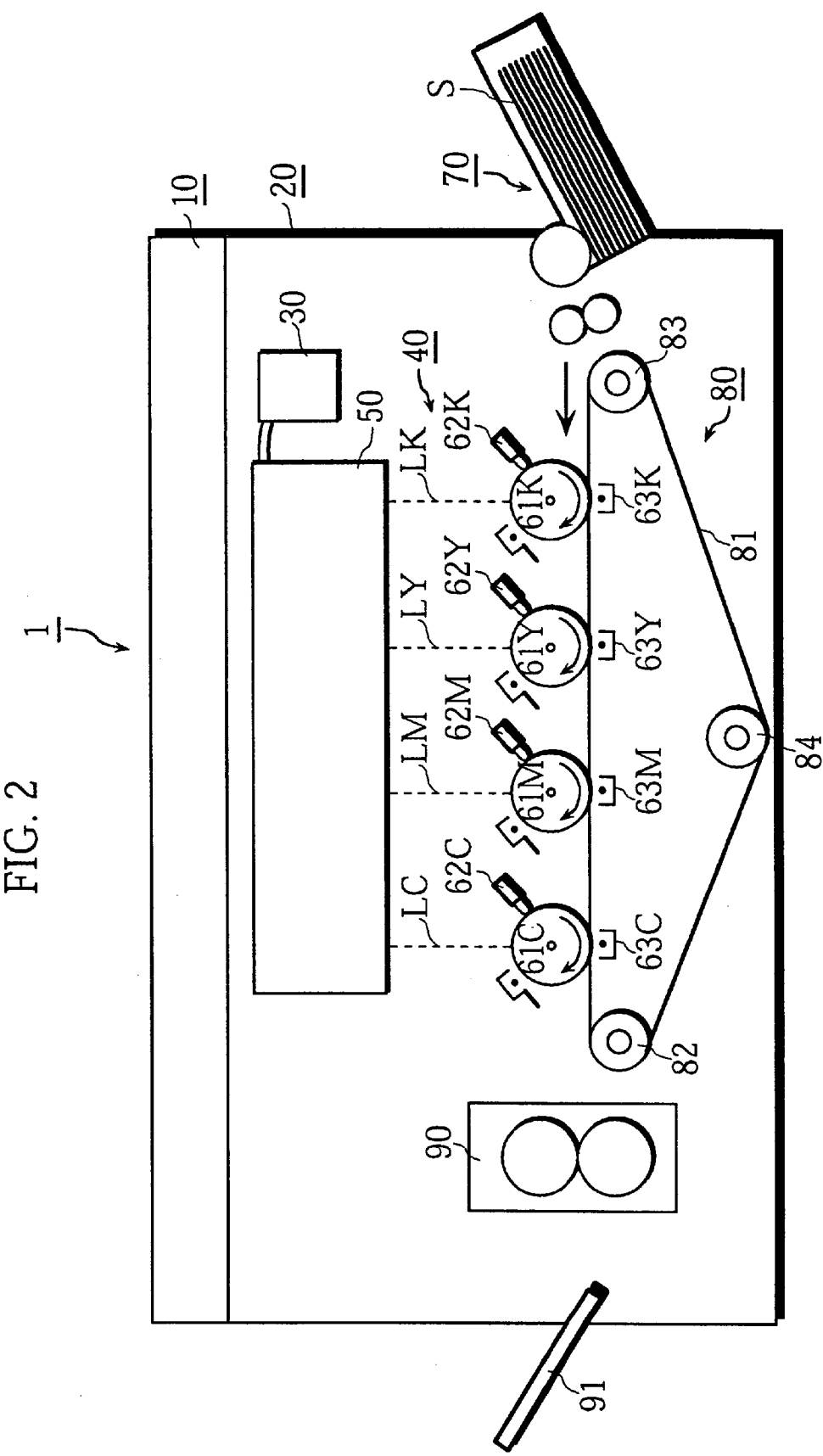
FIG. 2 shows a schematic view of an overall construction of a copying machine of the present embodiment.

FIG. 2 shows a schematic view of the overall construction of a copier 1.

As shown in FIG. 2, the copier 1 is composed of an image reading unit 10 for reading a document image and a printing unit 20 for reproducing the read document image on a recording sheet S.

The image reading unit 10 is a well-known component which has a scanner move laterally to read an image of a document placed on a document glass (not shown). The read image data is separated into color image data for red(R), green(G), and blue(B), which is then converted into electric signals by a CCD image sensor (not shown). As a result, image data for R, G, and B is obtained.

Various data processes are performed by a controlling unit 30 of the printing unit 20 on the R, G, and B image data obtained by the image reading unit 10. The image data is further converted into print data for reproduction colors C, M, Y, and K. The image data is then stored for each color in an image memory provided in the controlling unit 30.

The printing unit 20, which forms images using a well-known electrophotographic technique, is composed of an image forming unit 40 for exposing the photosensitive drums using the laser beams and forming toner images on the photosensitive drums, a paper supplying unit 70 for supplying the recording sheet S, a sheet transporting unit 80 for sequentially transporting the supplied recording sheet S to transfer positions of the photosensitive drums, and a fixing unit 90 for fixing toner particles on the recording sheet S after image transfer.

The image data is read for each reproduction color from the image memory of the controlling unit 30 for each scanning line, and the read image data is output to a printer head 50 of the image forming unit 40. Then, laser diodes 51K to 51C (shown in FIG. 3 and FIG. 5) are driven to respectively emit laser beams LK to LC corresponding to the reproduction colors. The laser beams LK to LC respectively expose the surfaces of photosensitive drums 61K to 61C in the main scanning direction to form electrostatic latent images. The electrostatic latent images are developed into toner images by corresponding developing units 62K to 62C which supply respective color toner.

Meanwhile, the paper supplying unit 70 supplies the recording sheet S one by one, and the sheet transporting unit 80 sequentially transports the recording sheet S to the transfer positions which are respectively set directly under the corresponding photosensitive drums 61K to 61C. The sheet transporting unit 80 is composed of a transport belt 81, a driving roller 82, a supporting roller 83, and a tension roller 84. The transport belt 81 runs over these rollers, and the necessary tension is given by the tension roller 84. The driving roller 82 is driven to rotate, so that the sheet transporting unit 80 transports the recording sheet S at a predetermined transportation speed in synchronization with an image forming operation for each color.

Transfer chargers 63K to 63C are respectively set at the corresponding transfer positions, facing the corresponding photosensitive drums 61K to 61C with the transport belt 81 in between. By means of electrostatic charges of the transfer chargers 63K to 63C, the toner images formed on the photosensitive drums 61K to 61C are sequentially transferred onto the recording sheet S. Here, each image forming operation is executed in synchronization with the timing at which the recording sheet S reaches a corresponding transfer position of the photosensitive drums 61K to 61C, so that each toner image is transferred onto the recording sheet S at the correct position. After this image transfer, the recording sheet S is transported to the fixing unit 90, where toner particles on the surface of the recording sheet S are fused and fixed in place with high heat. Finally, the recording sheet S is discharged onto a discharge tray 91.

Figure 3:
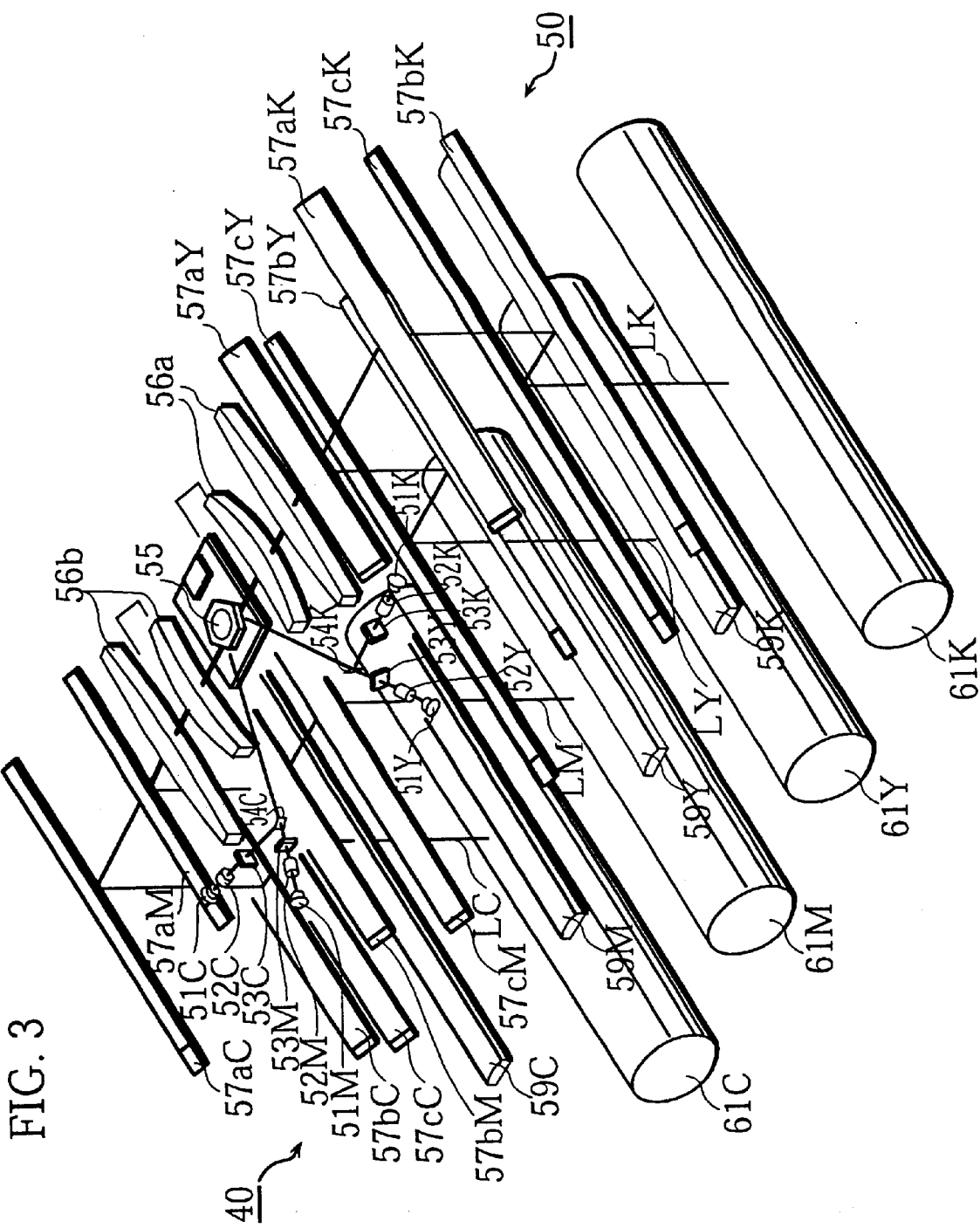
FIG. 3 shows a perspective view of a printer head and a sheet transporting unit as viewed from the upper-right hand.
Figure 4:
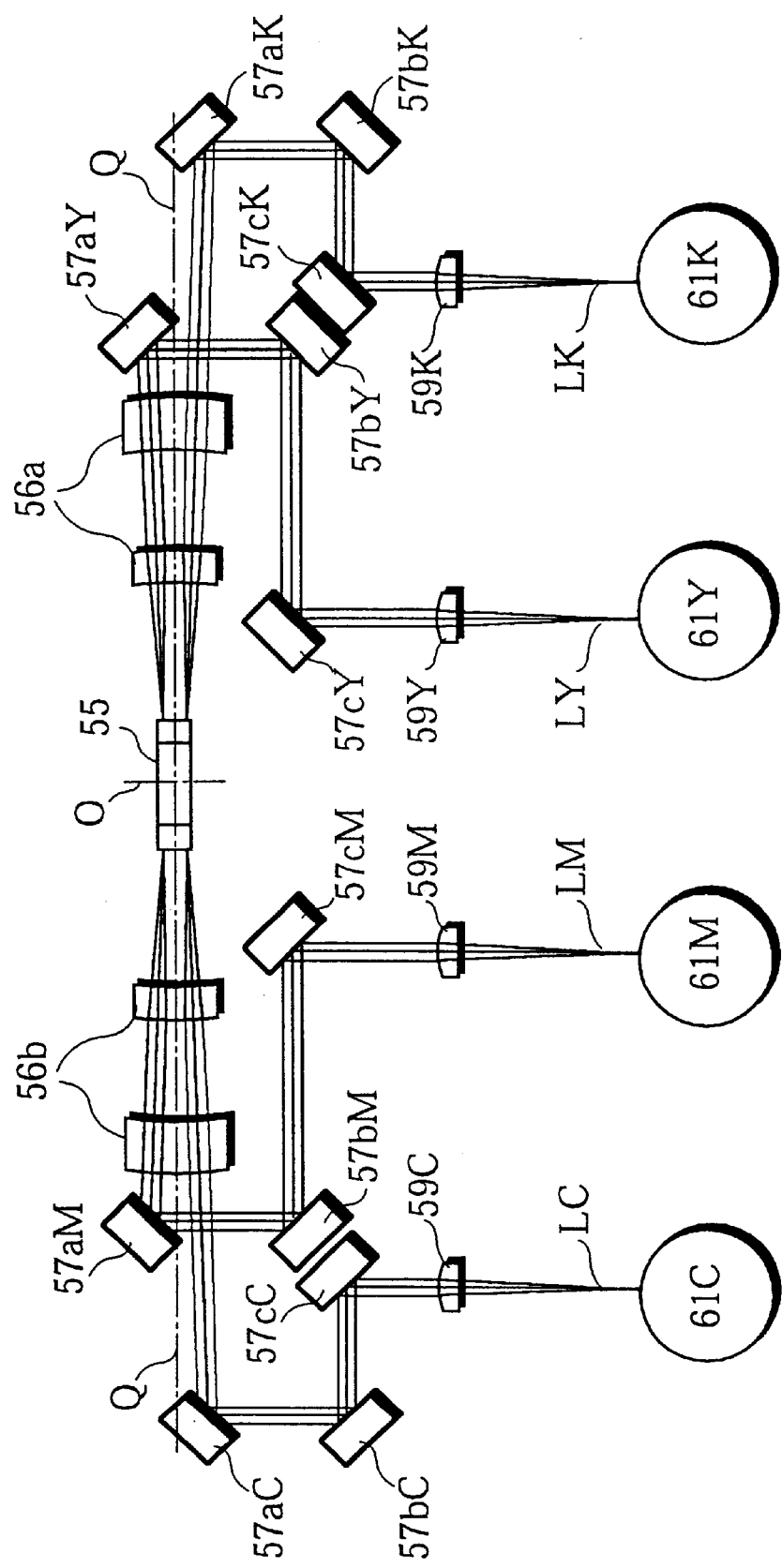
FIG. 4 shows a front view of the printer head and the sheet transporting unit.
Figure 5A:
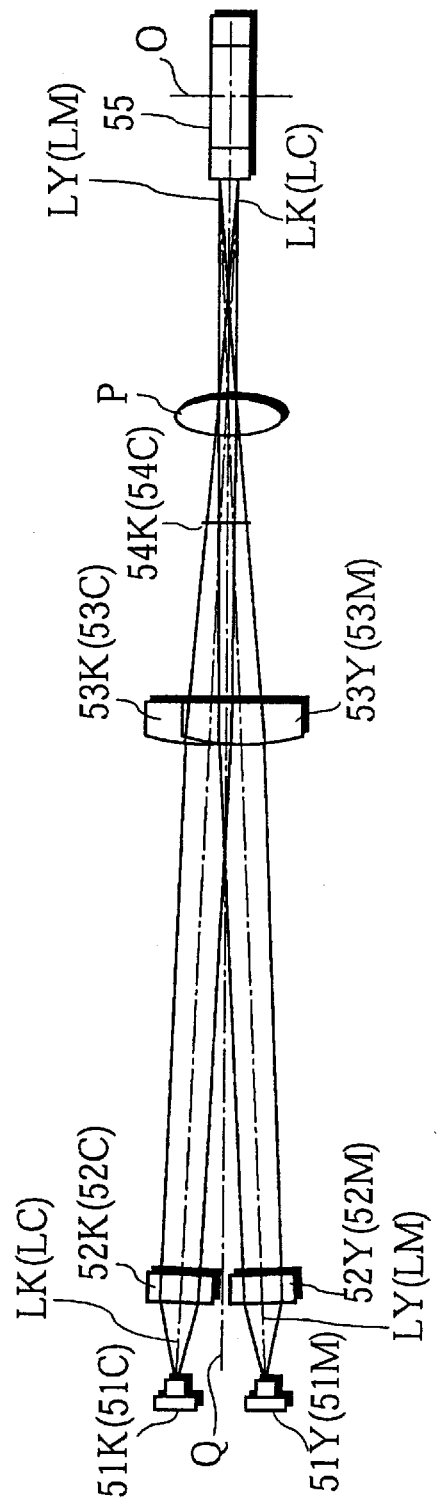
FIGS. 5A and 5B show light paths in the printer head.
Figure 5B:
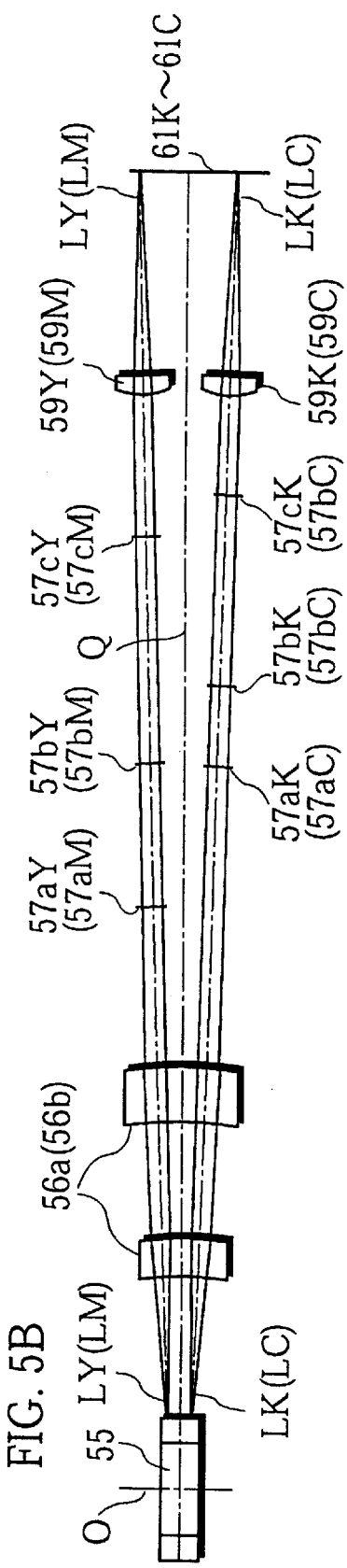

FIG. 3 is a perspective view of the printer head 50 and the sheet transporting unit 80 shown in FIG. 2 as viewed from the upper-right hand. FIG. 4 is a front view of the printer head 50 and the sheet transporting unit 80, and FIGS. 5A and 5B show light paths in the printer head 50. In FIG. 3 and FIG. 4, the developing units 62K to 62C and the transfer chargers 63K to 63C provided for the photosensitive drums 61K to 61C are not shown for the purpose of simplifying the drawings.

The printer head 50 has a polygon mirror 55 as a central component which is driven by a polygon motor (not shown) and rotates at a constant speed. The printer head 50 also has laser diodes 51K to 51C, scanning lenses 56a and 56b each including a pair of a toroidal lenses and an fθ lens, and redirecting mirrors 57aK to 57aC, 57bK to 57bC, and 57cK to 57cC. Here, the redirecting mirrors are divided in groups of three redirecting mirrors corresponding to the four reproduction colors. As one example, 57aK, 57bK, and 57cK is one group for black. Two groups for black and yellow and two groups for magenta and cyan are set symmetric with respect to a plane which includes the rotational axis O and is perpendicular to the sheet transportation direction, as shown in FIG. 4. The laser beams LK and LY are respectively emitted from the laser diodes 51K and 51Y that are located at the upstream side of the rotational axis O in the transportation direction of the recording sheet S, and are incident on one mirror face of the polygon mirror 55. Meanwhile, the laser beams LM and LC are respectively emitted from the laser diodes 51M and 51C that are located at the downstream side of the rotational axis O in the transportation direction of the recording sheet S, and are incident on another mirror face of the polygon mirror 55. Hereinafter, the sides viewed in the transportation direction of the recording sheet S are simply pk referred to as the "upstream side" and the "downstream side" in this specification. Taking the two laser beams LK and LY as one example, incidence angles are set so that the laser beams LK and LY intersect with each other at the position P which is located before the polygon mirror 55 as shown in FIG. 5A. In addition, the laser beams LK and LY are aligned on the mirror face of the polygon mirror 55 in the direction of the rotational axis O, that is, aligned in the sub-scanning direction. Incidence angles of the laser beams LM and LC are set in the same way.

As shown in FIG. 5A, the laser beams LK and LY emitted in the stated incidence angles from the laser diodes 51K and 51Y located at the upstream side of the polygon mirror 55 become parallel beams after respectively passing through cylinder-shaped collimator lenses 52K and 52Y. The parallel beams then respectively pass through first cylindrical lenses 53K and 53Y, and are converged only in the direction of the rotational axis O of the polygon mirror 55. The laser beam LK is reflected off the reflection mirror 54K and intersects with the laser beam LY at the position P. The laser beams LK and LY are symmetric with respect to the plane Q and vertically aligned on the mirror face of the polygon mirror 55, that is aligned in the direction of the rotational axis O. Accordingly, the laser beam LY emitted from the laser diode 51Y located under the plane Q is deflected on the mirror face of the polygon mirror 55 above the plane Q, while the laser beam LK emitted from the laser diode 51K located above the plane Q is deflected on the mirror face of the polygon mirror 55 under the plane Q. Here, geometric axes in the main scanning direction of the first cylindrical lenses 53K and 53Y are changed in the sub-scanning direction, so that the corresponding positions where the laser beams LK and LY are reflected off the polygon mirror 55 are adjusted.

The deflected laser beams LK and LY diverge from the plane Q with distance from the mirror face of the polygon mirror 55, and pass through the scanning lens 56a including the toroidal lens and the fθ lens. The laser beams LK and LY are respectively converged in the main scanning direction so that the main scanning speed is kept constant, while becoming nearly parallel beams in the sub-scanning direction. Then, the light paths of the laser beams LK and LY are changed by means of the redirecting mirrors 57aK to 57cK and 57aY to 57cY so that they are equal in length. The laser beams LK and LY expose the corresponding photosensitive drums 61K and 61Y in the main scanning direction to form the electrostatic latent images, via second cylindrical lenses 59K and 59Y which converge the laser beams only in the sub-scanning direction.

Meanwhile, the laser beams LC and LM emitted in the stated incidence angles from the laser diodes 51C and 51M located at the downstream side of the polygon mirror 55 become parallel beams after respectively passing through cylinder-shaped collimator lenses 52C and 52M. The parallel beams then respectively pass through first cylindrical lenses 53C and 53M, and are converged only in the direction of the rotational axis C of the polygon mirror 55. The laser beam LC is reflected off the reflection mirror 54C and intersects with the laser beam LM at the position P. The laser beams LC and LM are symmetric with respect to the plane Q and vertically aligned on the mirror face of the polygon mirror 55, that is aligned in the direction of the rotational axis O. Accordingly, the laser beam LM emitted from the laser diode LM located under the plane Q is deflected on the mirror face of the polygon mirror 55 above the plane Q, while the laser beam LC emitted from the laser diode 51C located above the plane Q is deflected on the mirror face of the polygon mirror 55 under the plane Q. Note that the laser beams LM and LC are incident on the polygon mirror 55 in the opposite direction of the laser beams LK and LY. As such, the laser beams LM and LC are reflected in the opposite direction, and the scanning direction is also opposite. For this reason, the reading order of the image data in the main scanning direction from the image memory for the laser beams LM and LC is controlled by the controlling unit 30 to be a reversal of the reading order for the laser beams LK and LY.

The deflected laser beams LC and LM diverge from the plane Q with distance from the mirror face of the polygon mirror 55, and pass through the scanning lens 56b. The laser beams LC and LM are respectively converged in the main scanning direction so that the main scanning speed is kept constant, while becoming nearly parallel beams in the sub-scanning direction. Then, the light paths of the laser beams LC and LM are adjusted by means of the redirecting mirrors 57aC to 57cC and 57aM to 57cM so that they are equal in length. The laser beams LC and LM expose the corresponding photosensitive drums 61C and 61M in the main scanning direction to form the electrostatic latent images, via the second cylindrical lenses 59C and 59M which converge the laser beams only in the sub-scanning direction.

In general, the polygon mirror 55 is directly connected to a rotational axis of the polygon motor. However, a slight clearance is formed between the rotational axis and bearings to secure a smooth rotation of the polygon motor, so that the rotational axis slightly tilts. Together with the tilt of the rotational axis, the polygon mirror 55 also tilts. As a result, the laser beams may be deflected in a unnecessary direction, and the scanning lines may deviated in the sub-scanning direction. For this reason, as described above, the laser beams LK to LC are respectively converged by the first cylindrical lenses 53K to 53C in the direction of the rotational axis O before being incident on the mirror faces of the polygon mirror 55, and are converged by the second cylindrical lenses 59K to 59C in the sub-scanning direction. Consequently, errors of recording positions on the photosensitive drums 61K to 61C caused by the tilt of the polygon mirror 55 are minimized, and linearity of the scanning lines are secured.

With the multibeam scanning device stated above, only one polygon mirror is needed, and therefore, a rotation controlling system can be easily constructed. In addition, all of the laser beams LK to LC are deflected by the polygon mirror 55, and the laser beams LK and LY pass through the scanning lens 56a while the laser beams LM and LC pass through the scanning lens 56b. As a result, the number of necessary lenses can be reduced, contributing to the simplification of the apparatus and the cost reduction.

In accordance with the incidence angles which is appropriately set, the laser beams LK and LY intersect with each other at the position P before reaching the mirror face of the polygon mirror 55, and are separated from each other in the sub-scanning direction with distance from the polygon mirror 55. So do the laser beams LM and LC. As such, even when the redirecting mirrors 57aK, 57aY, 57aM, and 57aC are set near the polygon mirror 55, the laser beams LK to LC are reliably separated. Consequently, no special lenses are necessary, thereby downsizing the apparatus.

Furthermore, pairs of laser beams, out of the laser beams LK to LC, are respectively incident on two mirror faces of the polygon mirror 55 respectively from the upstream side and from the downstream side of a plane that includes the rotational axis O of the polygon mirror 55 and is perpendicular to the sheet transportation direction, with the two mirror faces being symmetric with respect to the plane. This enables better separation of the laser beams.

Modifications

The present invention has been described in accordance with the present embodiment. It should be obvious that the present invention is not limited to the present embodiment, so that the following modifications can be made.

(1) In the stated embodiment, the laser beams LK and LY are incident on one mirror face of the polygon mirror 55 from the upstream side of the polygon mirror 55, while the laser beams LM and LC are incident on another mirror face of the polygon mirror 55 from the downstream side, with the two mirror faces being symmetric with respect to the plane that includes the rotational axis O and is perpendicular to the sheet transportation direction. However, the two pairs of laser beams may be respectively incident on two mirror faces of the polygon mirror 55, with the two mirror faces being symmetric with respect to the rotational axis O. In this way, the laser beams LK to LC can be easily separated from one another.

(2) In the stated embodiment, the laser beams LK to LC are incident on two mirror faces of the polygon mirror 55 which are symmetric with respect to a plane that is parallel to the main scanning direction of the photosensitive drums 61K to 61C. However, the laser beams LK to LC may be incident on one mirror face of the polygon mirror 55. By doing so, the laser beams LK to LC can be easily separated one another.

(3) In the present embodiment, a tandem-type color copier is used as an example of the present invention. However, the present invention is not limited to this, and a two-color copier where two laser beams scan one photosensitive drum may be used. Also, various kinds of image forming apparatuses, such as color laser printers, having devices that use laser beams as image writing means may be used.

Although the present invention has been fully described by way of examples with reference to the accompanying drawings. It is to be noted that various changes and modifications will be apparent to those skilled in the art.

Therefore, unless such changes and modifications depart from the scope of the present invention, they should be constructed as being included therein.

What is claimed is:

1. A multibeam scanning device comprising:
    a plurality of light sources, each emitting a light beam;
    at least one reflection mirror; and
    a deflecting unit, provided ahead in a light beam emitting direction of each of the plurality of light sources, for deflecting all light beams respectively emitted from the plurality of light sources, the deflecting unit having a deflecting facet,
    wherein at least two of the plurality of light sources are arranged so that the light beam of one of the two light sources reflects off the reflection mirror and intersects with the light beam of the other of the two light sources before reaching the deflecting facet.

2. The multibeam scanning device of claim 1, wherein the deflecting unit deflects the light beams respectively emitted from the plurality of light sources in a main scanning direction, with the plane that includes the intersecting light beams being perpendicular to the main scanning direction.

3. The multibeam scanning device of claim 1, wherein the deflecting unit has a plurality of mirror faces, and the intersecting light beams being deflected on a same mirror face of the deflecting unit.

4. The multibeam scanning device of claim 1 further comprising
    an scanning optical system which is set between the deflecting unit and at least one surface that is scanned by the light beams emitted from the plurality of light sources,
    wherein the intersecting light beams are incident on at least one lens element included in the optical system.

5. The multibeam scanning device of claim 1, wherein the deflecting unit has at least one mirror face which is driven to rotate about a rotational axis of the deflecting unit, and optical axes of the intersecting light beams being located in the plane which is parallel to a plane that includes the rotational axis of the deflecting unit.

6. The multibeam scanning device of claim 1, wherein the deflecting unit has at least one mirror face and deflects the light beams respectively emitted from the plurality of light sources in a main scanning direction, with the intersecting light beams being converged on the mirror face in a direction perpendicular to the main scanning direction.

7. The multibeam scanning device of claim 1, wherein the light sources emitting intersecting light beams are arranged in separate housings.

8. The multibeam scanning device of claim 1, wherein each intersecting light beam passes through a collimating lens before intersecting another light beam.

9. The multibeam scanning device of claim 1, wherein the light sources emitting intersecting light beams are respectively positioned at different heights.

10. The multibeam scanning device of claim 1, wherein the deflecting unit is a rotatable polygon mirror.

11. The multibeam scanning device of claim 10, wherein the at least two light sources intersect in a vertical plane that is parallel to a rotational axis of the deflecting unit.

12. A multibeam scanning device comprising:
    four light emitting units, each emitting a light beam;
    at least one reflection mirror; and
    a deflecting unit, which has a plurality of mirror faces which are driven to rotate about a rotational axis of the deflecting unit, for deflecting the four light beams respectively emitted from the four light emitting units,
    wherein pairs of light beams, out of the four light beams, reflect off the reflection mirror and intersect with each other before reaching the mirror face, each pair of intersecting light beams striking a different mirror face of the deflecting unit, and
    wherein the two mirror faces struck by the respective two pairs of intersecting light beams are symmetric with respect to a plane including the rotational axis of the deflecting unit.

13. The multibeam scanning device of claim 12, wherein the deflecting unit deflects the four light beams in a main scanning direction, with the planes that include the respective two pairs of intersecting light beams being perpendicular to the main scanning direction.

14. The multibeam scanning device of claim 12 further comprising
an optical system which is set between the deflecting unit and at least one surface that is scanned by the light beams emitted from the plurality of light sources,
wherein the intersecting light beams are incident on at least one lens element included in the optical system.

15. The multibeam scanning device of claim 12, wherein the optical axes of the intersecting light beams being located in a plane which is parallel to a plane that includes the rotational axis of the deflecting unit.

16. The multibeam scanning device of claim 12, wherein the light sources emitting intersecting light beams are arranged in separate housings.

17. The multibeam scanning device of claim 12, wherein each intersecting light beam passes through a collimating lens before intersecting another light beam.

18. A multibeam scanning device of claim 12, wherein the light sources emitting intersecting light beams are respectively positioned at different heights.

19. The multibeam scanning device of claim 12, wherein the deflecting unit is a rotatable polygon mirror.

20. The multibeam scanning device of claim 19, wherein the at least two light sources intersect in a vertical plane that is parallel to a rotational axis of the deflecting unit.

21. An image forming apparatus comprising:
a plurality of light sources, each emitting a light beam which has been independently modulated in accordance with image signals;
at least one reflection mirror;
a deflecting unit, provided ahead in a light beam emitting direction of each of the plurality of light sources, for deflecting all light beams respectively emitted from the plurality of light sources, the deflecting unit having a deflecting facet; and
at least one image holding component, wherein the light beams scan a surface of the at least one image holding component in a main scanning direction and in a sub-scanning direction which is perpendicular to the main scanning direction, whereby a two-dimensional image is formed on the surface of the at least one image holding component,
wherein at least two of the plurality of light sources are arranged so that one of the light beams reflects off the reflection mirror and intersects with the other light beam before reaching the deflecting facet.

22. The image forming apparatus of claim 21, wherein the deflecting unit deflects the lights beams respectively emitted from the plurality of light sources in a main scanning direction, with the plane that includes the intersecting light beams being perpendicular to the main scanning direction.

23. The image forming apparatus of claim 21, wherein the deflecting unit has a plurality of mirror faces, and the intersecting light beams being deflected on a same mirror face of the deflecting unit.

24. The image forming apparatus of claim 21, wherein the deflecting unit has at least one mirror face which is driven to rotate about a rotational axis of the deflecting unit, and optical axes of the intersecting light beams being located in the plane which is parallel to the plane that includes the rotational axis of the deflecting unit.

25. The image forming apparatus of claim 21, wherein the plurality of light sources are four light sources corresponding to four colors cyan, magenta, yellow, and black.

26. The image forming apparatus of claim 21, wherein the there are four image holding components corresponding to four colors cyan, magenta, yellow, and black.

27. The image forming apparatus of claim 21 further comprising an image forming unit for developing the two-dimensional images respectively formed on the surfaces of the four image holding components and for superimposing the two-dimensional images to form one image.

28. The image forming apparatus of claim 21,
wherein the plurality of light sources are four light sources corresponding to four colors cyan, magenta, yellow, and black, and
wherein the deflecting unit has a plurality of mirror faces which are driven to rotate about the rotational axis of the deflecting unit, and pairs of light beams, out of the four light beams respectively emitted from the four light sources, are incident on respective two mirror faces, with the two mirror faces being symmetric with respect to the plane including a rotational axis of the deflecting unit.

29. The image forming apparatus of claim 21, wherein the light sources emitting intersecting light beams are arranged in separate housings.

30. The image forming apparatus of claim 21, wherein each intersecting light beam passes through a collimating lens before intersecting another light beam.

31. The image forming apparatus of claim 21, wherein the light sources emitting intersecting light beams are respectively positioned at different heights.

32. The multibeam scanning device of claim 21, wherein the deflecting unit is a rotatable polygon mirror.

33. The multibeam scanning device of claim 32, wherein the at least two light sources intersect in a vertical plane that is parallel to a rotational axis of the deflecting unit.

34. A multibeam scanning device comprising:
a plurality of light sources, each emitting a light beam;
a plurality of collimating optical units, each of which collimates light beam emitted from one of the plurality of light sources respectively, and
a deflecting unit, provided ahead in a light beam emitting direction of each of the plurality of collimating optical units, for deflecting all light beams respectively emitted from the plurality of collimating optical units, the deflecting unit having a deflecting facet,
wherein at least two of the plurality of light sources are arranged so that the light beams emitted from the at least two light sources intersect with each other before reaching the deflecting facet and are symmetric to one plane extending between the deflecting facet and a point where the light beams intersect, the plane approximately orthogonally intersecting with planes that include deflected light beams.

35. An image forming apparatus comprising:
a plurality of light sources, each emitting a light beam which has been independently modulated in accordance with image signals;
a plurality of collimating optical units, each of which collimates the light beam emitted from one of the plurality of light sources respectively;
a deflecting unit, provided ahead in a light beam emitting direction of each of the plurality of collimating optical units, for deflecting all light beams respectively emitted from the plurality of collimating optical units, the deflecting unit having a deflecting facet; and
at least one image holding component, wherein the light beams scan a surface of the at least one image holding component in a main scanning direction and in a sub-scanning direction which is perpendicular to the main scanning direction, whereby a two-dimensional image is formed on the surface of the at least one image holding component, wherein at least two of the plurality of light sources are arranged so that the light beams respectively emitted from the at least two light sources intersect with each other before reaching the deflecting facet and are symmetric to one plane extending between the deflecting facet and a point where the light beams intersect, the plane approximately orthogonally intersecting with planes that include deflected light beams.

36. A multibeam scanning device comprising:

a plurality of light sources, each emitting a light beam;

a deflecting unit, provided ahead in a light beam emitting direction of each of the plurality of light sources, for deflecting all light beams respectively emitted from the plurality of light sources, the deflecting unit having a deflecting facet, and a plurality of scanning optical units, each of which image the light beams deflected by said deflecting unit onto a scanned surface respectively;

wherein at least two of the plurality of light sources are arranged so that the light beams emitted from the at least two light sources intersect with each other before reaching the deflecting facet and are symmetric to one plane extending between the deflecting facet and a point where the light beams intersect, the plane approximately orthogonally intersecting with planes that include deflected light beams.

37. An image forming apparatus comprising:

a plurality of light source, each emitting a light beam which has been independently modulated in accordance with image signals;

a deflecting unit, provided ahead in a light beam emitting direction of each of the plurality of light sources, for deflecting all light beams respectively emitted from the plurality of light sources, the deflecting unit having a deflecting facet;

a plurality of scanning optical units, each of which image the light beams deflected by said deflecting unit onto a scanned surface respectively; and at least one image holding component, wherein the light beams scan a surface of the at least one image holding component in a main scanning direction and in a sub-scanning direction which is perpendicular to the main scanning direction, wherein a two-dimensional image is formed on the surface of the at least one image holding component, wherein at least two of the plurality of light sources are arranged so that the light beams respectively emitted from the at least two light sources intersect with each other before reaching the deflecting facet and are symmetric to one plane extending between the deflecting facet and a point where the light beams intersect, the plane approximately orthogonally intersecting with planes that include deflected light beams.

38. A multibeam scanning device comprising:

a plurality of light sources, each emitting a light beam;

a plurality of collimating optical units, each of which collimates the light beam emitted from one of the plurality of light sources respectively;

a deflecting unit, provided ahead in a light beam emitting direction of each of the plurality of collimating optical units, for deflecting all light beams respectively emitted from the plurality of collimating optical units, the deflecting unit having a deflecting facet; and a plurality of scanning optical units, each of which image the light beams deflected by said deflecting unit onto a scanned surface respectively, wherein at least two of the plurality of light sources are arranged so that the light beams emitted from the at least two light sources intersect with each other before reaching the deflecting facet and are symmetric to one plane extending between the deflecting facet and a point where the light beams intersect, the plane approximately orthogonally intersecting with planes that include deflected light beams.

39. An image forming apparatus comprising:

a plurality of light sources, each emitting a light beam which has been independently modulated in accordance with image signals;

a plurality of collimating optical units, each of which collimates the light beam emitted from one of the plurality of light sources respectively;

a deflecting unit, provided ahead in a light beam emitting direction of each of the plurality of collimating optical units, for deflecting all light beams respectively emitted from the plurality of collimating optical units, the deflecting unit having a deflecting facet;

a plurality of scanning optical units, each of which image the light beams deflected by said deflecting unit onto a scanned surface respectively; and at least one image holding component, wherein the light beams scan a surface of the at least one image holding component in a main scanning direction and in a sub-scanning direction which is perpendicular to the main scanning direction, whereby a two-dimensional image is formed on the surface of the at least one image holding component, wherein at least two of the plurality of light sources are arranged so that the light beams respectively emitted from the at least two light sources intersect with each other before reaching the deflecting facet and are symmetric to one plane extending between the deflecting facet and a point where the light beams intersect, the plane approximately orthogonally intersecting with planes that include deflected light beams.

* * * * *